US011849391B2

(12) United States Patent
Tellado et al.

(10) Patent No.: US 11,849,391 B2
(45) Date of Patent: *Dec. 19, 2023

(54) DETERMINING WHEN TO ADJUST A POWER STATE OF ACCESS POINTS

(71) Applicant: Hewlett Packard Enterprise Development LP, Houston, TX (US)

(72) Inventors: Jose Tellado, Santa Clara, CA (US); Bernd Bandemer, Santa Clara, CA (US); Alexander Mendez, Santa Clara, CA (US); Hilmi Gunes Kayacik, Santa Clara, CA (US); Charlie Hogg, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,317

(22) Filed: Aug. 30, 2022

(65) Prior Publication Data

US 2022/0417846 A1    Dec. 29, 2022

Related U.S. Application Data

(63) Continuation of application No. 16/427,808, filed on May 31, 2019, now Pat. No. 11,438,835.

(51) Int. Cl.
*H04W 52/02* (2009.01)
*H04W 24/04* (2009.01)
*H04W 84/12* (2009.01)

(52) U.S. Cl.
CPC ....... *H04W 52/0206* (2013.01); *H04W 24/04* (2013.01); *H04W 84/12* (2013.01)

(58) Field of Classification Search
CPC . H04W 88/12; H04W 52/285; H04W 52/265; H04W 52/241; H04W 24/04; H04W 24/02; H04W 8/08; H04W 52/0206
See application file for complete search history.

(56) References Cited

U.S. PATENT DOCUMENTS

| 11,438,835 B2 * | 9/2022 | Tellado | H04W 52/0206 |
| 2012/0099495 A1 * | 4/2012 | Mitra | H04W 52/00 370/311 |

(Continued)

OTHER PUBLICATIONS

Budzisz, L. et al., "Dynamic Resource Provisioning for Energy Efficiency in Wireless Access Networks: A Survey and an Outlook", (Research Paper), 2014, vol. 16, No. 4, Fourth Quarter 2014, 27 Pgs.

(Continued)

*Primary Examiner* — Ajay Cattungal
(74) *Attorney, Agent, or Firm* — Hewlett Packard Enterprise Patent Department

(57) ABSTRACT

Example implementations relate to determining when to adjust a power state of access points. A non-transitory computer readable medium may store instructions executable by a processing resource to: determine a subset of a group of access points (APs) that is to provide, to a client device, at least a performance threshold during a particular time interval, wherein an AP of the subset of the group of APs serves the client device; and determine when to adjust a power state of a remaining AP of the group of APs based on: a first degree of performance being provided by a first set of radios of the subset of the group of APs; and a second degree of performance to be provided by the remaining AP of the group of APs if the group of client devices is provided a network connectivity via a second radio of the remaining AP of the group of APs.

20 Claims, 6 Drawing Sheets

(56) References Cited

U.S. PATENT DOCUMENTS

| | | | | |
|---|---|---|---|---|
| 2012/0230206 A1* | 9/2012 | Baliga | ............... | H04B 7/15528 |
| | | | | 370/243 |
| 2014/0269370 A1* | 9/2014 | Dharanipragada | ... | H04W 72/52 |
| | | | | 370/252 |
| 2015/0282070 A1* | 10/2015 | Salem | .............. | H04W 52/0206 |
| | | | | 370/311 |
| 2016/0037542 A1* | 2/2016 | Tang | .................... | H04W 16/10 |
| | | | | 370/329 |
| 2019/0007856 A1* | 1/2019 | Desai | ................... | H04W 72/29 |

OTHER PUBLICATIONS

Jardosh, A. et al., "Green WLANs: On-demand WLAN Infrastructures", 2018, 14 Pages.

Lozano, D. et al., "Energy Prediction of Access Points in Wi-Fi Networks According to Users' Behaviour", (Research Paper), Aug. 11, 2017, 17 Pgs.

Song, L. et al., "Predictability of WLAN Mobility and Its Effects on Bandwidth Provisioning", (Research Paper), Retrieved Sep. 11, 2018, 13 Pgs.

Wanalertlak, W. et al., "Behavior-based Mobility Prediction for Seamless Handoffs in Mobile Wireless Networks", (Research Paper), Retrieved Sep. 11, 2018, 14 Pgs.

* cited by examiner

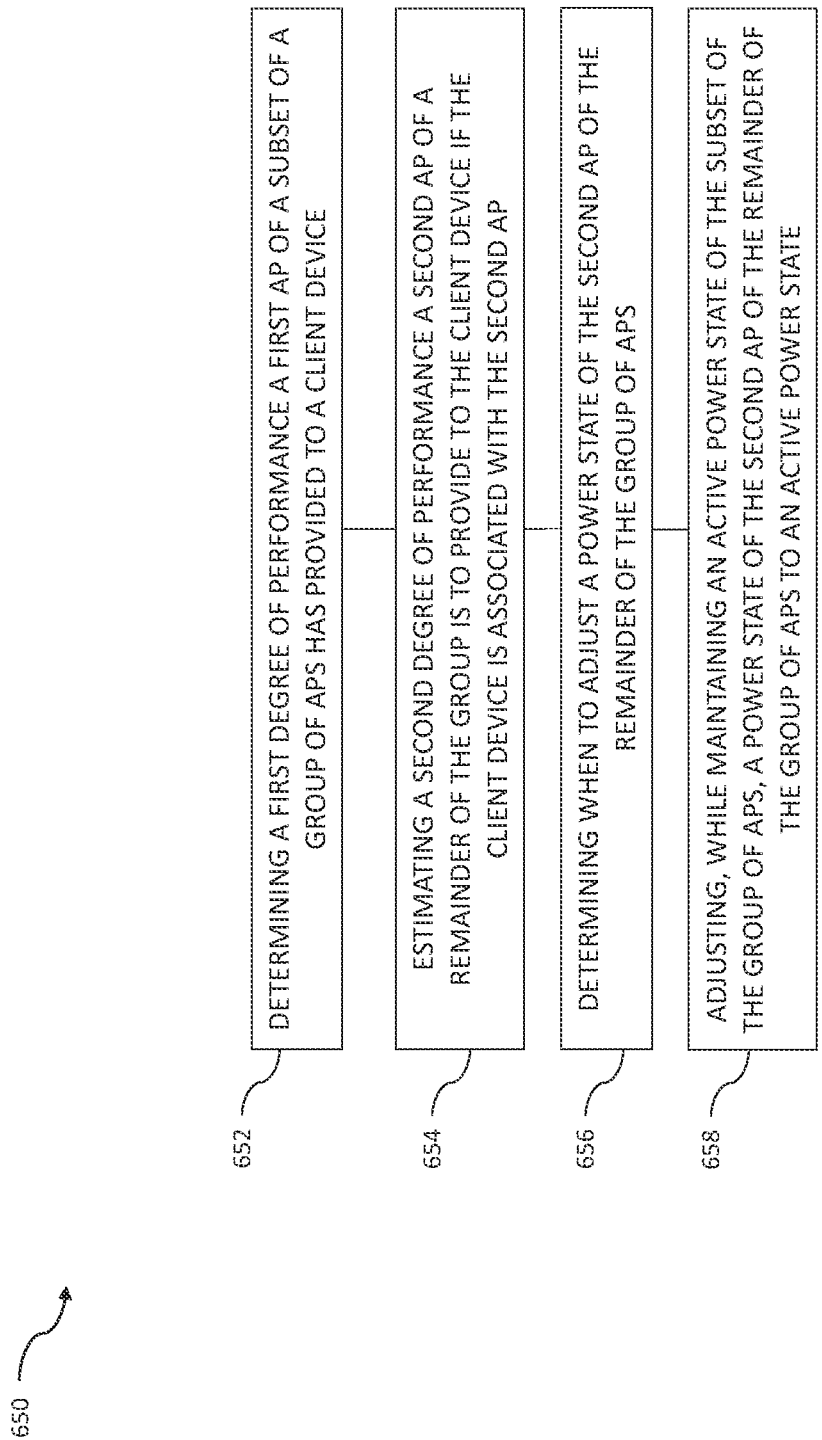

DETERMINING WHEN TO ADJUST A POWER STATE OF ACCESS POINTS

CROSS REFERENCE TO RELATED APPLICATIONS

This application is a continuation of, and claims the priority benefit of U.S. patent application Ser. No. 16/427,808, filed on May 31, 2019, issued as U.S. Pat. No. 11,438,835, the contents of which is incorporated herein by reference in its entirety.

BACKGROUND

In some computing networks, access points (APs) may provide network connectivity to client devices. These APs may be associated with controllers. The APs and the controllers may work in coalition to provide redundancy for reliable network connectivity in an event that an AP of the APs and/or a controller of the controllers fails.

BRIEF DESCRIPTION OF THE DRAWINGS

FIG. 6 illustrates an example method consistent with the disclosure.

DETAILED DESCRIPTION

In a computing network, APs can provide network connectivity to client devices associated with the APs. The APs of the computing network can be assigned to various types of controllers in order to provide network connectivity to client devices associated with the APs of the computing network. The various types of controllers can provide redundancy for network connections of the APs of the computing network. For example, areas of coverage provided by two or more APs may be overlapped to provide continuous network connectivity to the client devices.

A total number of APs located within an area may be increased proportional to a number of client devices and/or a sufficient degree of network connectivity designed to provide to the client devices. Often, the total number of APs to be located within the area may be determined based on a peak number of client devices and/or the sufficient degree of network connectivity. However, the total number of APs determined may not be fully utilized since a demand from a peak number of client devices and/or for a peak degree of network connectivity may not last permanently. Therefore, a portion of the total number of APs may have unnecessary power consumption, for instance, when less than the peak number of client devices are present within the area.

Accordingly, the disclosure is directed to determining a subset of APs to serve client devices, and further determine when to power-on/power-off each AP of the subset. Dynamically determining which subset to serve client devices and when to power-on/power-off APs of the subset may reduce unnecessary power consumption and yet provide a sufficient degree of network connectivity to client devices associated with the APs. According to the disclosure, power states of the APs may be adjusted based on a number of factors such as client information of current client devices (e.g., client devices currently associated with the APs), client information of past client devices (e.g., client devices previously associated with the APs), and/or a power model, which may be built based on the client information as mentioned above. Therefore, the disclosure may provide a flexibility in meeting a client demand and/or a power consumption goal, which may be dynamically altered as a number of and/or types of client devices differs from time to time.

Figure 1:
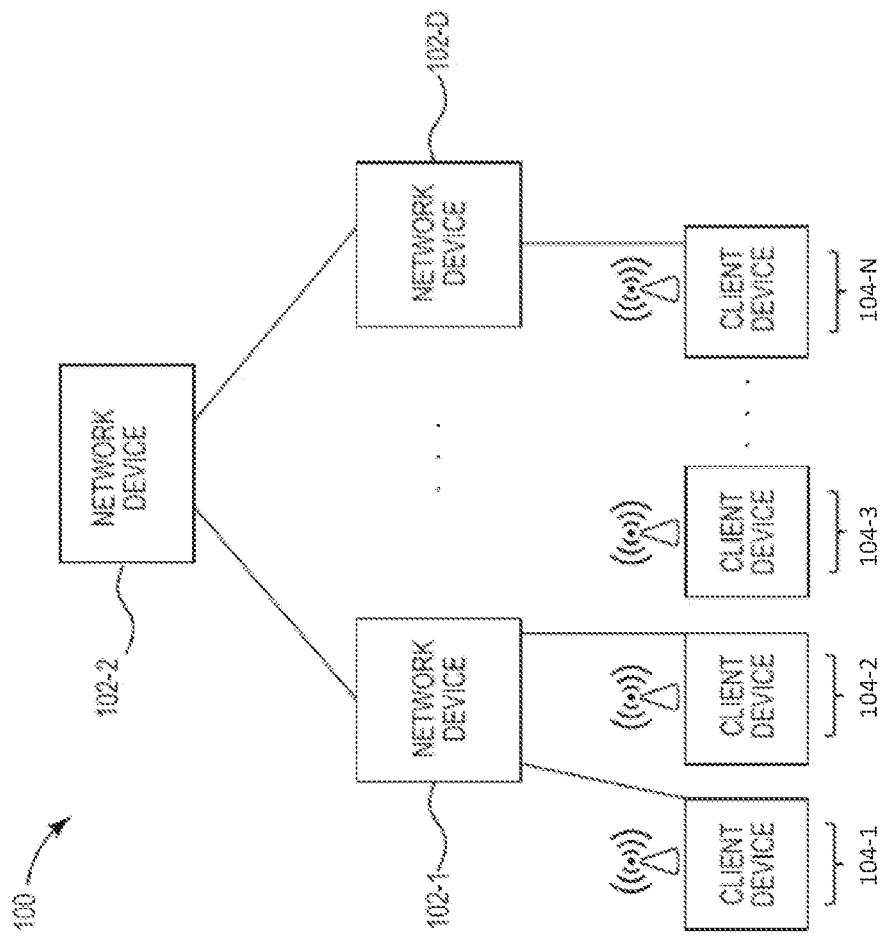
FIG. 1 illustrates an example of a network consistent with the disclosure.

FIG. 1 illustrates an example of a network 100 consistent with the disclosure. As illustrated in FIG. 1, the network layout 100 can include network devices 102-1, 102-2, . . . , 102-D (referred to collectively as network devices 102) and client devices 104-1, 104-2, 104-3, . . . 104-N (referred to collectively as client devices 104). As used herein, the term "network device" can, for example, refer to a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, network controllers, etc.) or the like.

In some examples, network devices 102 can include an access point (AP). An AP can refer to a networking device that allows a client device (i.e., a wireless client device) to connect to a wired or wireless network. As used herein, the term "access point" (AP) can, for example, refer to receiving points for any known or convenient wireless access technology which can later become known. Specifically, the term AP is not intended to be limited to IEEE 802.11-based APs. APs function as an electronic device that is adapted to allow wireless devices to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory.

A power state of an AP may be adjustable to a number of different power states. For example, a power state of the AP may be adjustable to an active state or a reduced power state. The reduced power state may be one of a sleep state, a standby state, and/or an off state. An AP in an active state may consume more power than in a reduced power state. For example, in an example where the AP has a plurality of transceivers, a greater number of, but not all of, the plurality of transceivers may be used during an active state that in a reduced power state. For example, an AP in an active state may be adjusted to operate with a greater network power (e.g., signal transmission/receipt signal) than in a reduced power state. For example, an AP in an active state may be allocated a different channel and/or more channels than an AP in a reduced power state. For example, an AP in an active state may provide a network connectivity to a client device via a radio corresponding to a higher frequency band (e.g., 5 gigahertz (GHz)) than an AP in a reduced power state (e.g., that provides a network connectivity via a radio corresponding to a frequency band such as 2.4 GHz).

In one example, a power state of an AP may be gradually adjusted. For example, a network power state may be gradually adjusted as the power state of the AP is gradually adjusted. In another example, a power state of an AP may include a plurality of different levels, and the power state of the AP may be sequentially placed from one level to a subsequent level as the power state of the AP is being adjusted.

In some examples, network devices 102 can include a network controller. For example, network device 102-2 can be a network controller while network devices 102-1, . . . , 102-D can be access points, among other possibilities. The network controller can include a processing resource such as a processing resource, memory, and input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. A network controller can include a memory resource, including read-write memory, and a hierarch of persistent memory such as ROM, EPROM, and Flash memory. The network controller 102-2 may include a controller that is a distributed and/or a cloud-based network controller. The network controller can include metrics such as a path-loss among APs (e.g., network devices 102-1, . . . , 102-D), a path-loss between the APs and the client devices 104, distances among the APs, and/or propagation rates among the APs, which can be utilized to determine which is to be powered on. The path loss among the APs and/or between the APs and the client devices 104 can be measured in various ways. For example, the path loss can be an average path loss and/or variance path loss.

As used herein, the term "client device" can, for example, refer to a device including a processing resource, memory, and input/output interfaces for wired and/or wireless communication. For example, the client devices 104 can include a laptop computer, a desktop computer, a mobile device, internet of things (IoT), and/or other wireless devices, although examples of the disclosure are not limited to such devices. A mobile device can, for example, refer to devices that are (or can be) carried and/or worn by a user. For instance, a mobile device can be a phone (e.g., a smart phone), a tablet, a personal digital assistant (PDA), smart glasses, and/or a wrist-worn device (e.g., a smart watch), among other types of mobile devices.

The network devices 102 and network devices 104 can be connected via a network relationship. As used herein, the term "network relationship" can, for example, refer to a local area network (LAN), a wireless local area network (WLAN), a virtual local area network (VLAN), wide area network (WAN), personal area network (PAN), a distributed computing environment (e.g., a cloud computing environment), storage area network (SAN), Metropolitan area network (MAN), a cellular communications network, and/or the Internet, among other types of network relationships.

A combination of network devices 102-1, . . . , 102-D and 102-2 can form a controller cluster that shares client information of the client devices 104 that are associated with, for example, the network devices 102-1, . . . , 102-D. For example, client information of a client device associated with a network device of the network devices 102-1, . . . , 102-D may be shared among the network devices 102-1, . . . , 102-D and the network device 102-2. In some examples, the network device 102-2 may be in charge of a centralized management of the network 100. For example, client information of a client device associated with a network device of the network devices 102-1, . . . , 102-D may be directed to the network device 102-2 such that the client information may be reversely propagated to others of the network devices 102-1, . . . , 102-D.

In some examples, the centralized management that can be provided by the network device 102-2 can include adjusting power states of a group of APs to reduce power consumption of the network devices 102-1, . . . , 102-D and yet providing a sufficient degree of network connectivity to the client devices 104. For example, a first subset of the group of APs can be put into an active state to serve the client devices 104 (e.g., by providing a respective network connectivity to each of the client devices 104) while a second subset of the group of APs can be put into a reduced power state to reduce power consumption of the network devices 102-1, . . . , 102-D. Which APs to include in the first subset or the second subset may be based on client information of client devices currently associated with the group of APs, client information of client devices previously associated with the group of APs, and/or a power model that may be built based on the above-mentioned client information. As an example, the client information that can be used to build the power model can include a number of client devices associated with the group of APs during a particular period, a degree of performance each of the group of APs has provided to a respective one of the client devices, a degree of performance each of the group of APs would have provided, when associated with a respective one of the client devices, a mobility state, a mobility pattern, a roaming pattern, a power state, a network power state, and a client power information of each client device, a feedback received from a client device, or a combination thereof, as described further herein. The terms "mobility pattern" and "mobility information" are used interchangeably herein and can have the same meaning. The term "client power information" can include various power-related information of a client device. As an example, the client power information can include a number of different power states (e.g., reduced power state such as hibernate, sleep, etc.) a client device can be put into, a client power switching pattern of a client device, and/or a power capability of a client device such as whether the client device is a battery-powered device and/or direct current (DC)-powered device. Further details of adjusting the power states based on the above-mentioned factors are described below.

Figure 2:
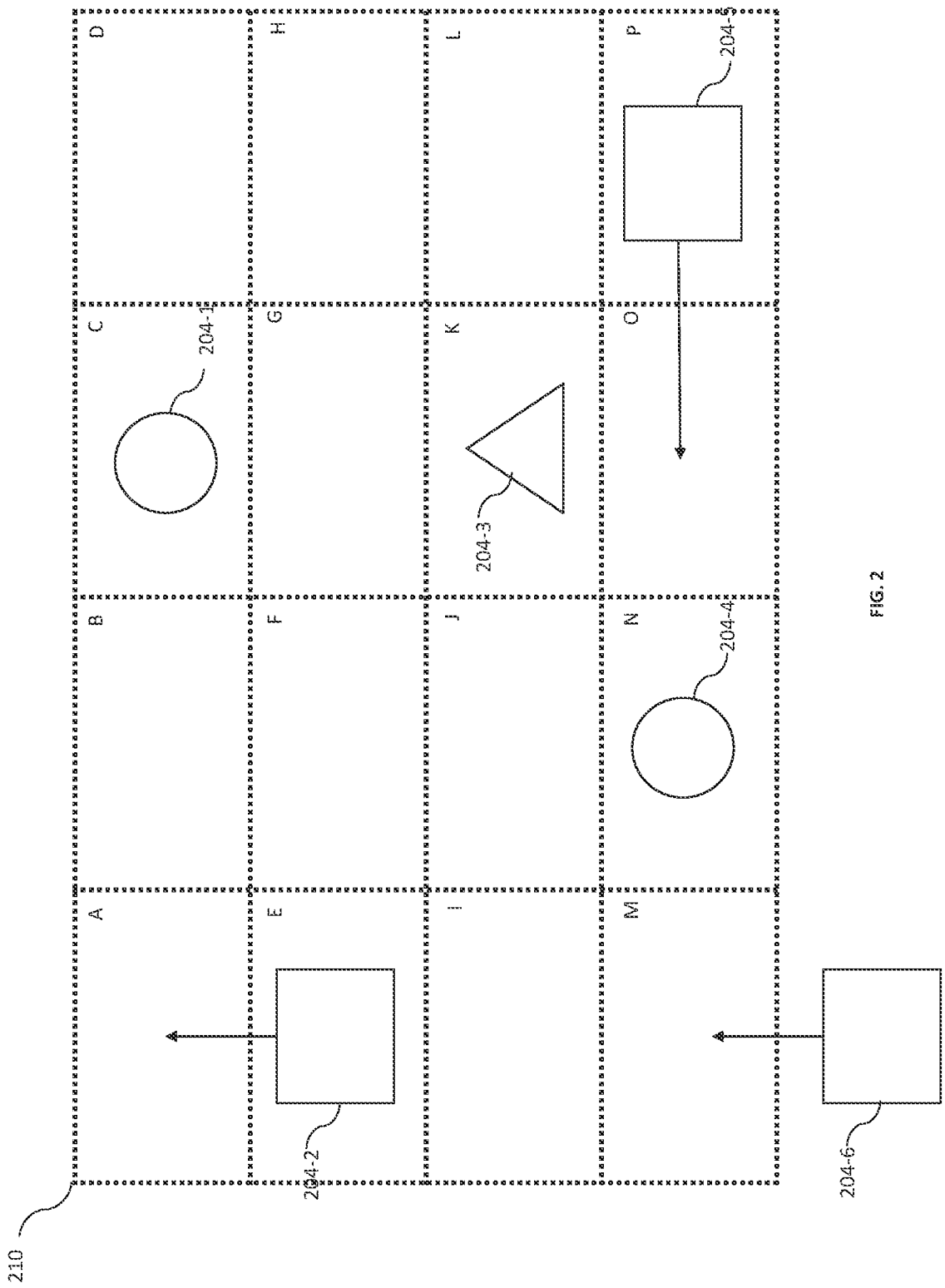
FIG. 2 illustrates client devices present in and/or near an area during a first time interval consistent with the disclosure.

FIG. 2 illustrates client devices 204-1, 204-2, 204-3, 204-4, 204-5, and 204-6 (collectively referred to as client devices 204) present in and/or near an area 210 during a first time interval. The client devices 204 are analogous to those described in connection with FIG. 1 (e.g., client devices 104).

As shown in FIG. 2, the area 210 is separated into a number of sub-areas such as sub-areas A through P as labeled in FIG. 2. A portion of a group of APs (e.g., network devices 102-1, . . . , 102-D described in connection with FIG. 1) may be powered on (e.g., put in to an active state) to provide a respective degree of performance to each of the client devices 204 that are present in a respective sub-area of as well as near the area 210 during the first time interval. As used herein, a degree of performance refers to a degree of network connectivity provided to a client device. For example, the degree of performance may be an indicator of how fast data are being communicated between the client device and an AP the client device is associated with. A degree of performance may be measured based on a performance characteristic of a signal received at an AP from a client device (e.g., a client device of the client devices 204) and/or transmitted from the AP to the client device. For example, the performance characteristic may include a packet latency, a packet retry or drop rate, a data transmission/receipt rate, a signal-to-noise (SNR) ratio, channel state information, or a combination thereof.

As shown in FIG. 2, each of the client devices 204 is located in a respective sub-area at a particular moment during the first time interval. For example, the client device 204-1 is located in the sub-area C, the client device 204-2 is located in the sub-area E, the client device 204-3 is located in the sub-area K, the client device 204-4 is located in the sub-area N, the client device 204-5 is located in the sub-area P, and the client device 204-6 is located outside of the area 210 at the particular moment during the first time interval.

The client devices 204 may be of various client device characteristics. As shown in FIG. 2, the client devices 204-2, 204-5, and 204-6 having a rectangular shape may be of a same client device characteristic, the client devices 204-3 (e.g., and other client devices) having a triangular shape may be of a same client device characteristic, and the client devices 204-1 and 204-4 having a circular shape may be of a same client device characteristic. The client device characteristics may include, for example, an operating system (e.g., Android®, iOS®, Linux®, Windows®, etc.) run by, a client device type (e.g., desktop, laptop, smartphone, and/or IoT, etc.), a network frequency band capability (2.4 GHz, 5 GHz, etc.), a channel list (e.g., including 5 GHz DFS channels) or bandwidth capability (20 MHz, 40 MHz, 80 MHz, 80+80 MHz, 160 Mhz), a total number of transceivers (1×1, 2×2, 4×4, etc.), a wireless communication technique indicating a number of transceivers being simultaneously used (e.g., single-input and single-output (SISO), multiple-input and multiple-output (MIMO), etc.) a wireless specification (e.g., such as those created by the Institute of Electrical and Electronics Engineers (IEEE) LAN/MAN Standards Committee (IEEE 802) provide media access control (MAC) and physical layer (PHY) specifications for implementing wireless local area network (WLAN) computer communication) of the client devices.

Determining which AP to power on to serve the client devices 204 may be based on a power model, which can take into account a number of factors. In some examples, the number of factors can include a degree of performance (e.g., an estimated degree of performance) an AP is to provide to a client device (e.g., of the client devices 204) if the client device is associated with the AP. Stated alternatively, even when a client device has not already been associated with an AP, a degree of performance that would have been provided from the AP to the client device (e.g., had the client device been associated with the AP) can be estimated and utilized for further determining which AP to power on. In some examples, a degree of performance can be estimated based on an interaction between a client device and an AP. As an example, an AP may send a sample packet to a client device (e.g., even when the client device is not associated with the AP) and the estimated degree of performance may be determined based on a performance characteristic of a signal received from the client device in return of the sample packet previously sent. Subsequent to determining the estimated degree of performance, a subset of the group of APs can be selected to serve a plurality of client devices. As used herein, the term "serving" refers to an agreement (by a client device and an AP) to exchange security credentials such as DHCP packets and/or data packets, in addition to exchanging a sample packet.

In some examples, the number of factors can include an end-to-end delay indicating a performance rate of delivering a packet from a client device to a destination. The end-to-end delay can be measured based on an actual degree of performance (e.g., client device to AP propagation delay including a transmission delay, a propagation delay, and/or a processing delay) an AP has provided to a client device that is associated with the AP and/or a degree of performance between two of the group of APs (e.g., AP to AP propagation delay including a transmission delay, a transmission delay, and/or a processing delay). For example, a subset of the group of APs may be pruned (e.g., by being placed into a reduced power state) responsive to determining that a respective degree of performance is less than a performance threshold.

In some examples, the number of factors can include an AP density. As an example, an AP density can indicate a quantity of APs to an area and/or sub-area ratio, and/or a degree of how well wireless propagate through the area and/or the sub-area.

In some examples, the number of factors can include various AP capabilities. As an example, an AP can be capable of communicating with a client device via different network bands (e.g., 2.4 GHz only, 2.4 GHz along with an 5 GHz, and/or 2.4 GHz along with two 5 GHz radios or channels). As an example, an AP can be capable of communicating with a client device via different WiFi generations (e.g., 802.11n, 802.11ac wave1, 802.11ac wave2 with MIMO, and/or 802.11ax with OFDMA). As an example, an AP can be capable of communicating with a client device by utilizing various numbers of transceivers for each radio. As an example, an AP can be capable of communicating with a client device by utilizing different number of transceivers or with internal and/or external antennas (e.g., directional or omnidirectional). As an example, an AP can be capable of communicating with a client device while utilizing different types of power over Ethernet options (PoE), such as 802.11af, 11at, and/or 11bt with different power capabilities, such as 12 watt (W), 25 W, and/or 40 W. In some examples, APs can have various capabilities based on its model, such as whether an AP is an indoor or outdoor model, and/or its power consumption, which may range from 10 W to 40 W.

The number of factors can further include a mobility state, a mobility pattern, a roaming pattern, a power state, a network power state, and a client power switching pattern of each client device, a feedback received from a client device, or a combination thereof, as described further herein. A mobility state of a client device may be determined based on whether the client device is mobile (e.g., moving) or immobile. For example, a mobility state of (e.g., mobile) client devices 204-2, 204-5, and 204-6 may be different than a mobility state of (e.g., immobile) client devices 204-1, 204-3, and 204-4.

A mobility pattern of a client device may be determined based on how the client device moves during a time interval and/or while the client device is being associated with the group of APs and/or is present in the area 210. For example, a mobility pattern of the client device 204-2 may be from a sub-area E to a sub-area A, a mobility pattern of the client device 204-5 may be from a sub-area P to a sub-area O, and a mobility pattern of the client device 204-6 may be from an outside of the area 210 to a sub-area M.

A roaming refers to an event in which a client device switches its association with one AP to another AP. For example, when the associated client device physically moves to a new location that is outside or near the boundary of the coverage of the AP that the client device is associated with, the client device may disassociate with the AP and complete an association handshake process with a different AP that provides a better degree of performance at the new location. Therefore, a roaming pattern can be determined based on a pattern of a number of roamings occurred between the client device and the group of APs. For example, the client device 204-5 may be associated with an AP of the group of APs when the client device 204-5 is located in the sub-area P, and switches to a different AP of the group of APs as it moves to a different sub-area (e.g., sub-area N and/or O) to receive a better degree of performance.

A network power state refers to a state of a transmission/receipt signal strength of a client device. As an example, a first client device that utilizes a 2.4 GHz frequency band may is in a different network power state than a second client device that utilizes a 5 GHz frequency band. A transmit power is an example of a network power state.

A client power switching pattern refers to a client device's switching pattern among a number of client power states. For example, some client devices may switch from a 2.4 GHz to a 5 GHz for a greater degree of performance, while some client devices may switch from a 5 GHz to a 2.4 GHz to reduce a power consumption (or from 2×2 transceivers to 1×1 to reduce power). As an example, a client device may switch from a 5 GHz to a 2.4 GHz when a power state of the client device falls below a threshold.

In some examples, a client device (e.g., client devices 204) can provide a feedback on a quality of a signal (e.g., degree of performance) received from a respective AP of the APs (e.g., network devices 102-1). The feedback provided by the client device can be utilized to determine which AP to power on to serve the client device. For example, a particular AP whose performance is rated better than other APs by the client device may be powered on to serve the client device. The feedback provided by the client device can be frequency band-specific and/or channel-specific. For example, the feedback provided by the client device can indicate which signal received from a particular AP performs better than others signals at a particular frequency bandwidth and/or channel.

In some examples, the above-mentioned factors may be determined based on various client device characteristics and/or capabilities such as a client device type, an operating system, a network frequency band capability, a total number of transceivers, and/or a wireless specification. These characteristics of client devices (e.g., client devices 204) may be obtained in advance of the client devices 204 being associated with the group of APs and/or based on real-time interaction with the client devices 204. As an example, information associated with those characteristics may be provided from respective client device while being associated with respective APs of the group of APs.

Accordingly, those factors (e.g., client information) including an estimated degree of performance, an actual degree of performance (e.g., a degree of performance an AP has provided to a client device while the client device is associated with the AP), a mobility state, mobility pattern, a roaming pattern, power state, network power state, a client power switching pattern of, and/or a feedback received from the client devices 204 may become basis for adjusting a power state of the group of APs. Stated differently, a power state of the group of APs may be dynamically adjusted based on real-time interaction with the client devices 204. Adjusting a power state of the group of APs can include, for example, determining a first subset of the group of APs and placing the first subset into an active state, while placing a second subset of the group of APs in a reduced power state, which can provide benefits such as saving an overall power consumption of the group of APs.

In some examples, dynamically adjusting a power state of the group of APs based on the real-time interaction with the client devices 204 may be performed locally. For example, real-time interaction with the client device 204-5 may affect a power state of APs present in and/or responsible for the sub-area P, while not affecting a power state of other APs.

In some examples, determining the first subset and the second subset can be based on different modes including, for example, a power saving mode and/or a performance mode. For example, the first subset in a first mode (e.g., coverage mode) provides a minimal degree of performance to each of the client devices 204, while the first subset in a second mode (e.g., capacity mode) provides more than a minimal degree of performance (e.g., desired performance). As such, the first subset in the second mode may include more APs and/or is capable of providing a greater degree of performance than the first subset in the first mode. The first subset in the first mode may be referred to as a coverage group and the first subset in the second mode may be referred to as a capacity group. The different modes may be selectable by a user to determine a tradeoff between a power consumption and a degree of performance of APs.

Changing from the coverage mode to the capacity mode may place more APs into an active state. As such, when more APs are in an active state in the capacity mode, at least a portion of the client devices 204, which were associated with a number of APs during the coverage mode, may be reassigned to a different AP such that the client devices 204 are evenly distributed among the APs that are newly powered on during the capacity mode.

In some examples, a first degree of performance provided (e.g., by powered-on APs) to a first client device (e.g., of the client devices 204) may be different than a second degree of performance provided to a second client device (e.g., of the client devices 204) when the first client device and the second client device have a different mobility state. For example, the client devices 204-2, 204-5, and 204-6 that are mobile may be provided a greater degree of performance than that provided to the client devices 204-1, 204-3, and 204-4 that are immobile.

In some examples, a first degree of performance provided to a first client device may be different than a second degree of performance provided to a second client device when the first client device and the second client device are in a different network power state. For example, the first client device using a 5 GHz may be provided a greater degree of performance than the second client device using a 2.4 GHz. A network power state also may be indirectly determined based on other factors. For example, the first client device having a number of transceivers greater than that of the second client device may be provided a greater degree of performance. As used herein, a "transceiver" refers to a device including both a transmitter and a receiver. As another example, the first client device operating according to a wireless specification using multiple transceivers simultaneously (e.g., MIMO in 802.11n) may be provided a greater degree of performance than the second client device operating according to a wireless specification using an individual transceiver (e.g., SISO in 802.11ac). As another example, the first client device having a greater network frequency band capability (e.g., a client device capable of 5 GHz wireless communication) than that of the second client device (e.g., a client device capable of wireless communication in a frequency band up to 2.4 GHz) may be provided a greater degree of performance.

In some examples, a first degree of performance provided to a first client device may be different than a second degree of performance provided to a second client device when the first client device and the second client device are in different locations. For example, the client devices 204-1, 204-2, 204-3, 204-4, and 204-5 that are located within the area 210 may be provided a greater degree of performance than the client device 240-6 that is located outside of the area 210.

In some examples, a first degree of performance provided to a first client device may be different than a second degree of performance provided to a second client device when the first client device and the second client device have a different device type. For example, the first client device may be a laptop, desktop, and/or a smartphone that are usually capable of 5 GHz wireless communication, while the second client device may be an IoT that is usually capable of a wireless communication up to 2.4 GHz. Accordingly, in this example, the first client device may be assumed to have a greater network frequency band capability and be provided a greater degree of performance than the second client device.

The number of factors (e.g., an estimated degree of performance, an actual degree of performance, a mobility state, mobility pattern, a roaming pattern, power state, network power state, and/or a client power switching pattern of the client devices 204) can also become basis for determining a power model, which may be utilized to predict a degree of performance to be provided to future client devices (e.g., client devices 304 that may be associated with the group of AP during a second time interval). Further details of adjusting power states of the group of APs for future client devices based on the previously determined power model are described in connection with FIG. 3.

Figure 3:
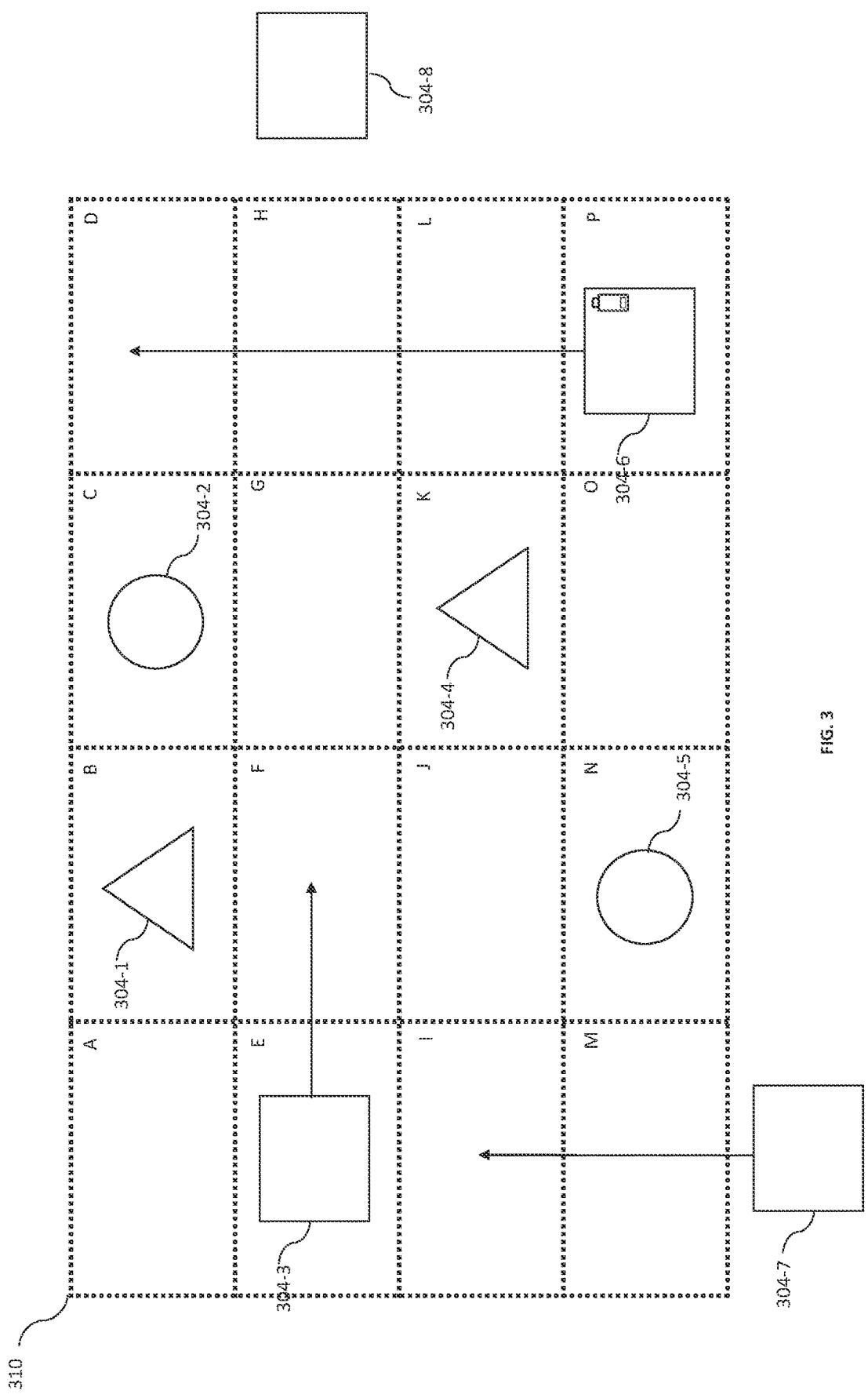
FIG. 3 illustrates client devices present in and/or near an area during a second time interval consistent with the disclosure.

FIG. 3 illustrates client devices 304-1, 304-2, 304-3, 304-4, 304-5, 304-6, 304-7, and 304-8 (collectively referred to as client devices 304) present in and/or near an area 310 during a second time interval. The area 310 may be analogous to the area 210 described in connection with FIG. 2, and the second time interval may be subsequent to the first time interval. For example, the client devices 304 may be present in and/or near the area 310 a week after a time when the client devices 203 were present in and/or near the area 210.

The second time interval (e.g., during which the client devices 304 are associated with the group of APs) may be representative of the first time interval (e.g., during which the client devices 204 are associated with the group of APs) such that the client information of the client devices 204 may be used to predict a degree of performance the group of APs is to provide to the client devices 304. For example, if the first time interval is a 1-hour period (e.g., 9 am to 10 am) on first Monday, the second time interval can be a same 1-hour (e.g., 9 am to 10 am) period on second Monday following the first Monday.

A degree of performance the group of AP is to provide to client devices 304 during the second time interval can be predicted based on a power model. As described herein, the power model is previously determined based on client information of the client devices 204 that were previously associated with the group of APs during the first time interval.

Based on the power model, for example, an amount of a load of client devices during a time interval at a location (e.g., sub-area) and a degree of performance the group of AP is to provide to each of the quantity of client devices may be predicted. An amount of a load of client device can include a quantity of client devices and/or a volume of traffic offered to the client devices associated with the group of APs during the time interval at the location. Based on the prediction, a power state of each AP of the group of APs can be dynamically adjusted to provide a network connectivity to each of the client devices 304 located in various sub-areas of the area 310. As an example, during the second interval and based on the prediction, a subset of the group of APs can be selectively adjusted to an active state (e.g., powered on) to serve the client devices 304, while remaining APs of the group of APs can be selectively adjusted to a reduced power state (e.g., powered off), which can provide benefits such as avoiding unnecessary power consumption of the group of APs.

Initially, the client devices 304 may be located in various sub-areas and some of the sub-areas may be left as not being occupied by the client devices 304. For example, there are no client devices 304 located in the sub-areas A, D, F, G, H, I, J, L, M, and O, as shown in FIG. 3. Therefore, these sub-areas having no client device located therein may be free of providing network connectivity; and hence, be free of a demanding degree of performance. As used herein, a demanding degree of performance refers to a degree of network connectivity that a client device demands. For example, the demanding degree of performance can represent a degree of performance that is sufficient to perform a network application properly by the client device (e.g., without experiencing undesired latencies). Accordingly, as long as the client devices 304 are predicted to stay in a same location as shown in FIG. 3, a subset of the group of APs that is, for example, in charge of providing network connectivity to the sub-areas B, C, E, K, N, and P (e.g., where the client devices 304 are respectively located) may be placed in an active state.

A respective degree of performance being provided to each client device of the client devices 304 may be maintained above a performance threshold, which may be predetermined, for example, based on the client information of the client devices 204. As described herein, the performance threshold may be further adjusted based on the client information and/or a demanding degree of performance of the client devices 304.

During the second time interval, a number of events that would change a demanding degree of performance from each sub-area may occur. For example, during the second time interval, the client device 304-3 moves from a sub-area E to F during the second time interval, the client device 304-6 moves from a sub-area P to a sub-area D, and the client device 304-7 that was located outside of the area 310 moves into the sub-area I, as illustrated in FIG. 3. For example, the client devices 304 may (e.g., even without moving to a different sub-area) demand a more or less capacity. Accordingly, a new demanding degree of performance may be predicted based on the power model and/or dynamically determined based on real-time interaction with the client devices 304.

To predict a new demanding degree of performance, the power model previously determined based on the client information of the client devices 204 may be used to predict a pattern to be shown by the client devices 304. Although examples are not so limited, a pattern that can be predicted consistent with the disclosure can include a mobility pattern (along with a mobility state) and/or a client power switching pattern (along with a network power state). The predicted patterns can be again used to predict the new demanding degree of performance.

The network power state and/or switching pattern of a client device of the client devices 304 can be predicted based on a client power switching pattern and/or a network power state shown by a client device of the client devices 204 having a same client device characteristic as that of a client device of the client devices 304. For example, it may be determined and/or observed that a client device of client devices 204 having an operating system may switch from 2×2 to 1×1 when a power state of the client device falls below a threshold. Assuming that the operating system also runs on the client device 304-6, it may be observed that a power state of the client device 304-6 has not much margin until the threshold, and predicted that the client device 304-6, at some point during the second time interval, may switch from 2×2 to 1×1, which can decrease a demanding degree of performance of the client device 304-6.

The mobility pattern and/or state of each of the client devices 304 can be predicted based on a mobility pattern and/or a mobility state shown by a client device of the client devices 204 having a same client device characteristic as that of each of the client devices 304. For example, since it was determined and/or observed that the client devices 204-1, 204-3, and 204-4 were immobile during the first time interval, and it may be predicted that the client devices 304-1, 304-2, 304-4, and 304-5 (e.g., having a same device characteristic as the client devices 204-1, 204-3, and 204-4) are to be immobile during the second time interval. As another example, since it was determined and/or observed that the client devices 204-2, 204-5, and 204-6 were mobile during the first time interval, it may be predicted that the client devices 304-3, 304-6, 304-7, and 304-8 (e.g., having a same device characteristic as the client devices 204-2, 204-5, and 204-6) are to be mobile during the second time interval. Similarly, a mobility pattern of each of the client devices 304-3, 304-6, 304-7, and 304-8 during the second time interval may also be predicted based on the power model including client information of client devices (e.g., client devices 204-1, 204-3, and 204-4) including previously associated with the group of APs and having the same device characteristics.

As a demanding degree of performance of a client device (e.g., client devices 304) dynamically changes during the second time interval, the demanding degree of performance may be continuously compared to a performance threshold. When the demanding degree of performance is less than the performance threshold, a power state of the group of APs adjusted as predicted may stay the same and/or may be further adjusted to reduce a degree of performance being provided to the client devices such that a power consumption of the group of APs can be reduced. When the demanding degree of performance becomes greater than the performance threshold, the performance threshold can be further adjusted (e.g., more APs can be adjusted to an active state) to meet the demanding degree of performance; and hence, a power state of the group of APs can be further adjusted based on the adjusted performance threshold.

At the end of the second time interval and/or at a later time subsequent to the second time interval, the power model previously determined based on the second client devices 204 may be further modified based on the client information of the client devices 304 obtained and determined during the second time interval. Therefore, the power model that is being dynamically adjusted based on client information of recent client devices may provide benefits such as reflecting a trend of client devices recently associated with the group of APs, which can predict a degree of performance the group of APs is to provide to future client devices more precisely.

Figure 4:
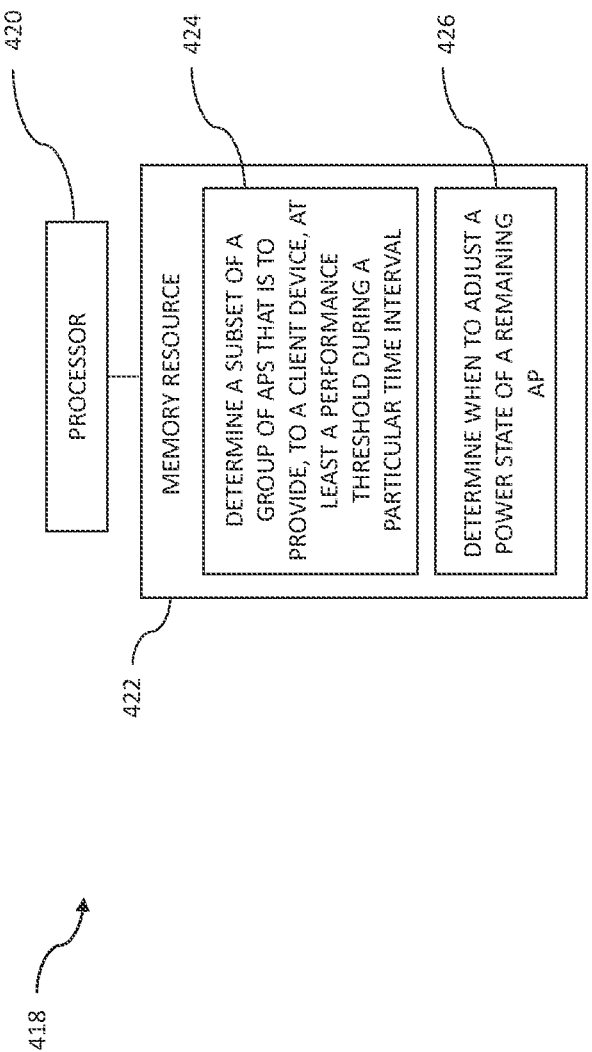
FIG. 4 is a block diagram of an example system consistent with the disclosure.

FIG. 4 is a block diagram of an example system 418 consistent with the disclosure. In the example of FIG. 4, system 418 includes a processor 420 and a machine-readable storage medium 422. Although the following descriptions refer to an individual processor and an individual machine-readable storage medium, the descriptions may also apply to a system with multiple processors and multiple machine-readable storage mediums. The instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor 420 may be a central processing unit (CPU), microprocessor, and/or other hardware device suitable for retrieval and execution of instructions stored in machine-readable storage medium (e.g., memory resource) 422. In the particular example shown in FIG. 4, processor 420 may receive, determine, and send instructions 424 and 426. As an alternative or in addition to retrieving and executing instructions, processor 420 may include an electronic circuit comprising electronic components for performing the operations of the instructions in machine-readable storage medium 422. With respect to the executable instruction representations or boxes described and shown herein, it should be understood that part or all of the executable instructions and/or electronic circuits included within one box may be included in a different box shown in the figures or in a different box not shown.

Machine-readable storage medium 422 may be any electronic, magnetic, optical, or other physical storage device that stores executable instructions. Thus, machine-readable storage medium 422 may be, for example, Random Access Memory (RAM), an Electrically-Erasable Programmable Read-Only Memory (EEPROM), a storage drive, an optical disc, and the like. The executable instructions may be "installed" on the machine-readable storage medium 422 illustrated in FIG. 4. Machine-readable storage medium 422 may be a portable, external or remote storage medium, for example, that allows the system 418 to download the instructions from the portable/external/remote storage medium. In this situation, the executable instructions may be part of an "installation package". As described herein, machine-readable storage medium 422 may be encoded with executable instructions for adjusting power states of access points based on a power model.

Determine instruction 424, when executed by a processor such as processor 420, may cause system 418 to determine a subset of a group of APs (e.g., network devices 102 as described in connection with FIG. 1) that is to provide, to a client device, at least a performance threshold. The subset may be determined to serve the client device, for example, during a particular time period and/or while the client device is present within a coverage range of the group of APs.

Determine instruction 426, when executed by a processor such as processor 420, may cause system 418 to determine when to adjust a power state of a remaining AP of the group of APs. For example, when a degree of performance being provided by the subset of the group of APs is less than the performance threshold, the remaining AP, such as an AP that was not previously selected as the subset, can be put into an active power state to meet the performance threshold such that the client device can be provided a network connectivity via a radio of the remaining AP. Stated alternatively, the remaining AP may not be put into the active power state as long as the degree of performance being provided by the subset of the group of APs is equal to or above the performance threshold.

As used herein, a radio can correspond to a respective frequency band. As an example, that the client device is provided the network connectivity via a radio may indicate that the client device is provided the network connectivity via a 2.4 GHz and/or 5 GHz. In some examples, the client device may be provided a network connectivity via different radios from a same AP. As an example, an individual AP may be able to provide both 2.4 GHz and 5 GHz network connectivity to the client device. In some examples, different radios may be provided from different APs. As an example, a first AP may provide 2.4 GHz network connectivity while a second AP (e.g., different AP) may provide 5 GHz network connectivity. Accordingly, switching from a first radio to a second radio (e.g., for providing a network connectivity to a client device) does not necessarily indicate a switch from one AP to another AP.

Figure 5:
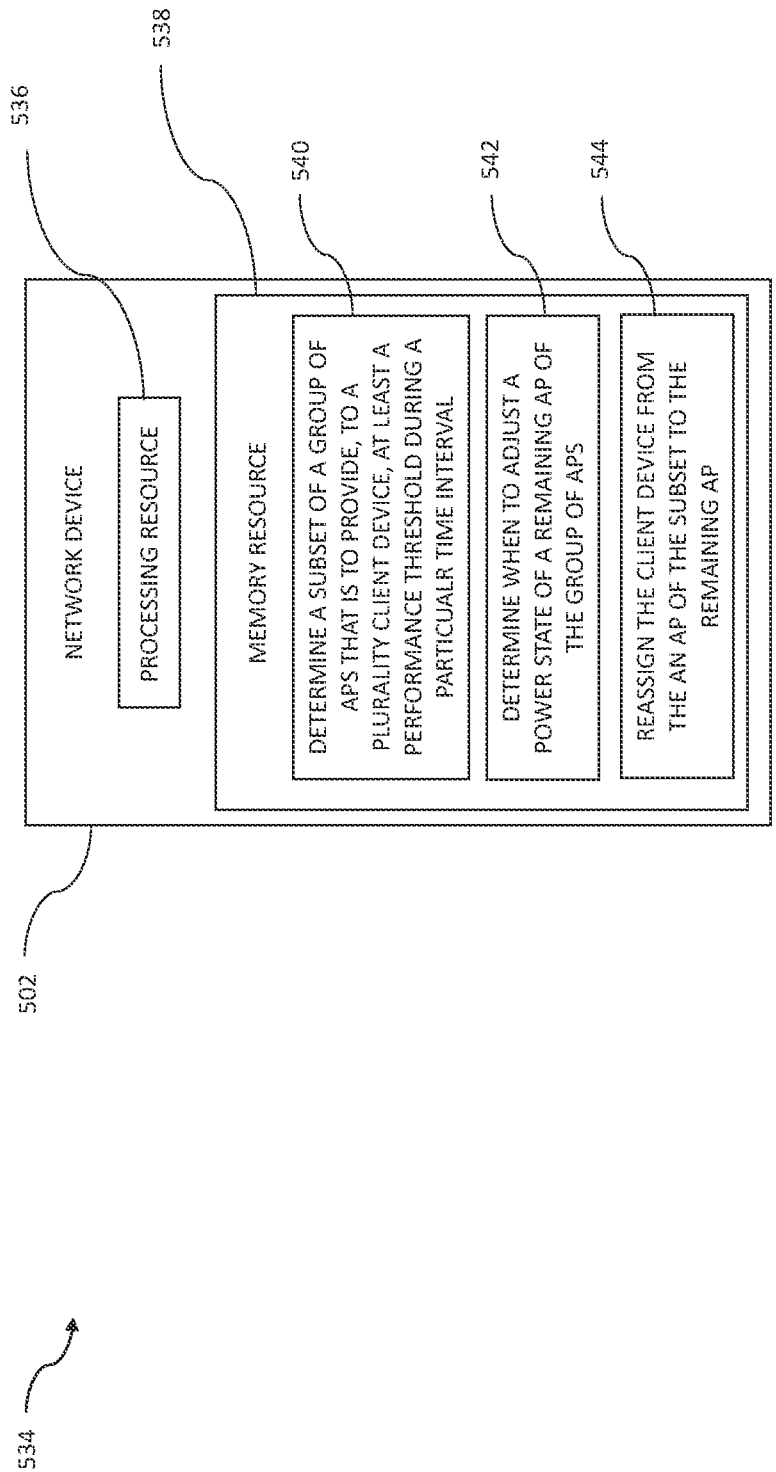
FIG. 5 is a block diagram of an example network device consistent with the disclosure.

FIG. 5 is a block diagram 534 of an example network device 502 consistent with the disclosure. As described herein, the network device 502 may perform a number of functions related to adjusting power states of access points based on a power model. Although not illustrated in FIG. 5, the network device 502 may include a processor and a machine-readable storage medium. Although the following descriptions refer to an individual processor and an individual machine-readable storage medium, the descriptions may also apply to a system with multiple processors and multiple machine-readable storage mediums. In such examples, the network device 502 may be distributed across multiple machine-readable storage mediums and the network device 502 may be distributed across multiple processors. Put another way, the instructions executed by the network device 502 may be stored across multiple machine-readable storage mediums and executed across multiple processors, such as in a distributed or virtual computing environment.

As illustrated in FIG. 5, the network device 502 may comprise a processing resource 536, and a memory resource 538 storing machine-readable instructions to cause the processing resource 536 to perform a number of operations relating to adjusting power states of access points based on a power model. Processing resource 536 may be a central processing unit (CPU), microprocessor, and/or other hardware device suitable for retrieval and execution of instructions stored in memory resource 538.

The network device 502 may include instructions 540 stored in the memory resource 538 and executable by the processing resource 536 to determine a subset of a group of APs (e.g., network devices 102 as described in connection with FIG. 1) that is to provide, to a plurality of client devices, at least a performance threshold during a particular time interval. The network device 502 may include instructions 542 stored in the memory resource 538 and executable by the processing resource 536 to determine when to adjust a power state of a remaining AP of the group of APs based on a first degree of performance and a second degree of performance. As an example, the first degree of performance is the one being provided by a first set of radios of the subset of the group of APs and the second degree of performance is the one to be provided by the remaining AP of the group of APs if an AP of the plurality of client devices is provided a network connectivity via a second radio of the remaining AP of the group of APs. The network device 502 may include instructions 544 stored in the memory resource 538 and executable by the processing resource 536 to reassign a client device of the plurality of client devices from an AP of the subset of the group of APs to the remaining AP of the group of APs in response to the remaining AP being pu into the active power state. For example, it may be determined and/or predicted that a degree of performance being provided from the subset may, at some point, become insufficient to meet client demands due to various reasons. In this example, the remaining AP may be tested to see if a degree of performance that would be provided from the remaining AP would be sufficient to meet the client demands. If it is determined so, the client device may be reassigned from an AP of the subset to the remaining AP.

FIG. 6 illustrates an example method 650 consistent with the disclosure. Method 650 may be performed, for example, by a network device (e.g., network devices 102, previously described in connection with FIG. 1). At 652, the method 650 includes (e.g., in response to determining that the client device is associated with a group of APs) determining a first degree of performance a first AP of the group of APs has provided to the client device. At 654, the method 650 includes estimating a second degree of performance the first AP is to provide to the client device if the client device is associated with the first AP.

At 656, the method 650 includes determining when to adjust, to maintain a degree of performance being provided to the client device above a performance threshold, a power state of a remaining AP of the group of APs based on client information including the first degree of performance and the second degree of performance. At 658, the method 650 includes adjusting, while maintaining an active power state of the subset of the group of APs, a power state of the remaining AP of the group of APs to an active power state.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Similar elements or components between different figures may be identified by the use of similar digits. For example, 104 may reference element "04" in FIG. 1, and a similar element may be referenced as 304 in FIG. 3. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure and should not be taken in a limiting sense.

The term "coupled" means directly or indirectly connected. Unless stated otherwise, the term "coupled" can include a wireless connection.

What is claimed:

1. A non-transitory computer readable medium storing instructions executable by a processing resource to cause the processing resource to:
   determine a subset of a group of access points (APs) that is to provide, to a client device, at least a performance threshold during a particular time interval, wherein an AP of the subset of the group of APs serves the client device; and
   determine when to adjust a power state of a remaining AP of the group of APs based on:

a first degree of performance being provided by a first set of radios of the subset of the group of APs; and a second degree of performance to be provided by the remaining AP of the group of APs if the group of client devices is provided a network connectivity via a second radio of the remaining AP of the group of APs.

2. The medium of claim 1, further comprising instructions to:

adjust a power state of the subset of the group of APs to an active power state; and maintain the adjusted power state of the subset of the group of APs during the particular time interval.

3. The medium of claim 1, further comprising instructions to adjust the power state of the remaining AP to an active power state in response to a degree of performance being provided by an AP of the subset of the group of APs being less than the performance threshold.

4. The medium of claim 1, further comprising instructions to adjust the power state of the remaining AP to an active power state in response to a change of an amount of load of a plurality of client devices and associated with the subset of the group of APs during the particular time interval.

5. The medium of claim 4, wherein the amount of load of client devices comprises at least one of:

a quantity of the plurality of client devices; and a volume of traffic offered to the plurality of client devices during the particular timer interval.

6. The medium of claim 1, further comprising instructions to maintain the power state of the remaining AP to a reduced power state at least while the degree of performance being provided by an AP of the subset of the group of APs being equal to or above the performance threshold.

7. The medium of claim 1, wherein the instructions to determine the subset is based on client power information of another client device associated with one AP of the group of APs prior to the particular time interval and having a same device type as that of the first client device.

8. The medium of claim 1, wherein the instructions to determine the subset is based on mobility pattern of another client device associated with one AP of the group of APs prior to the particular time interval and having a same device type as that of the first client device.

9. A network device, comprising:

a processing resource; and a memory resource including instructions executable by a processing resource to:

determine a subset of a group of access points (APs) that is to provide, to a plurality of client devices, at least a performance threshold during a particular time interval;

determine when to adjust a power state of a remaining AP of the group of APs based on:

a first degree of performance being provided by a first set of radios of the subset of the group of APs; and a second degree of performance to be provided by the remaining AP of the group of APs if a client device of the plurality of client devices is provided a network connectivity via a second radio of the remaining AP of the group of APs;

reassign the client device of the plurality of client devices from an AP of the subset of the group of APs to the remaining AP of the group of APs in response to the remaining AP being put into the active power state.

10. The network device of claim 9, wherein the memory resource includes instructions executable by the processing resource to adjust a power state of the AP of the subset of the group of APs to a reduced power state in response to the client device of the plurality of client devices being reassigned to the remaining AP of the group of APs.

11. The network device of claim 9, wherein the instructions to determine the subset is based on client information including a wireless network capability of the client device of the plurality of client devices.

12. The network device of claim 11, wherein the wireless network capability is determined based on at least one of:

a quantity of transceivers of the client device;

a frequency band capability;

a wireless local area network (WLAN) specification; and a device type of the respective client device of the second plurality of client devices.

13. A method, comprising:

in response to determining that a client device is associated with a first AP of a subset of a group of access points (APs):

determining a first degree of performance the first AP of the subset of the group of APs has provided to the client device; and estimating a second degree of performance a second AP of a remainder of the group of APs is to provide to the client device if the client device is associated with the second AP of the remainder of the group of APs;

determining when to adjust, to maintain a degree of performance being provided to the client device above a performance threshold, a power state of the second AP of the remainder of the group of APs based on client information including the first degree of performance and the second degree of performance; and adjusting, while maintaining an active power state of the subset of the group of APs, a power state of the second AP of the remainder of the group of APs to an active power state.

14. The method of claim 13, further comprising adjusting the power state of the second AP of the remainder of the group of APs to an active power state in response to:

the first degree of performance being below the performance threshold; and the second degree of performance being above the performance threshold.

15. The method of claim 13, further comprising:

requesting a feedback from the client device; and determining the subset of the group of APs based on the feedback provided from the client device.

16. The method of claim 13, further comprising:

determining at least one of the client information and device type of the client device; and determining the subset of the group of APs based on the determined client information.

17. The method of claim 13, wherein adjusting the power state of the second AP of the remainder the group of APs comprises adjusting a transmit power of the second AP of the remainder of the group of APs.

18. The method of claim 13, wherein adjusting the power state of the second AP of the remainder of the group of APs comprises allocating a different channel to the second AP of the remainder of the group of APs.

19. The method of claim 13, further comprising:

receiving, while the client device is associated with the first AP of the group, a packet by the second AP of the remainder of the group of APs from the client device to estimate the second degree of performance.

20. The method of claim 19, further comprising:
exchanging subsequent packet with the client device in response to sending the packet;
determining, based on the received signal, a performance characteristic of the received signal including at least one of a packet latency, a packet drop rate, a data transmission/receipt rate, and a signal-to-noise (SNR); and
estimating the second degree of performance based on the determined performance characteristic.

* * * * *